Figure 1:
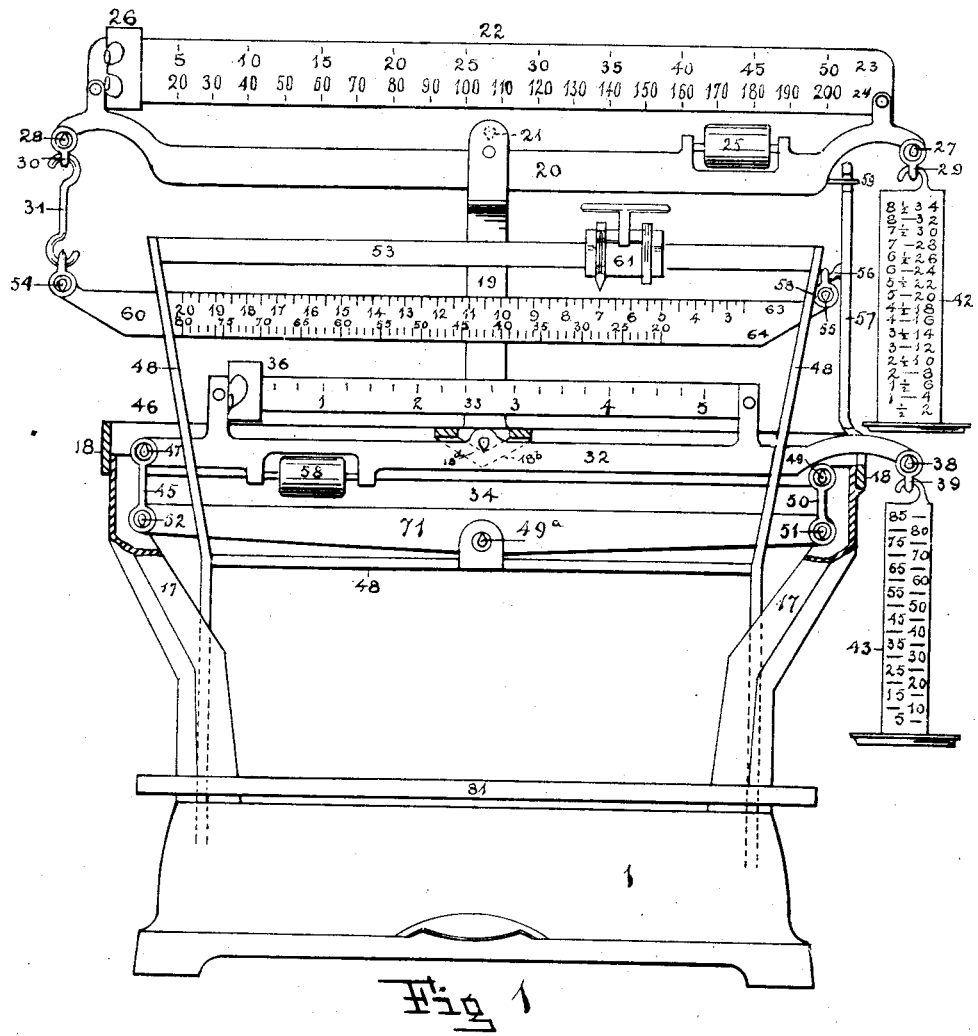

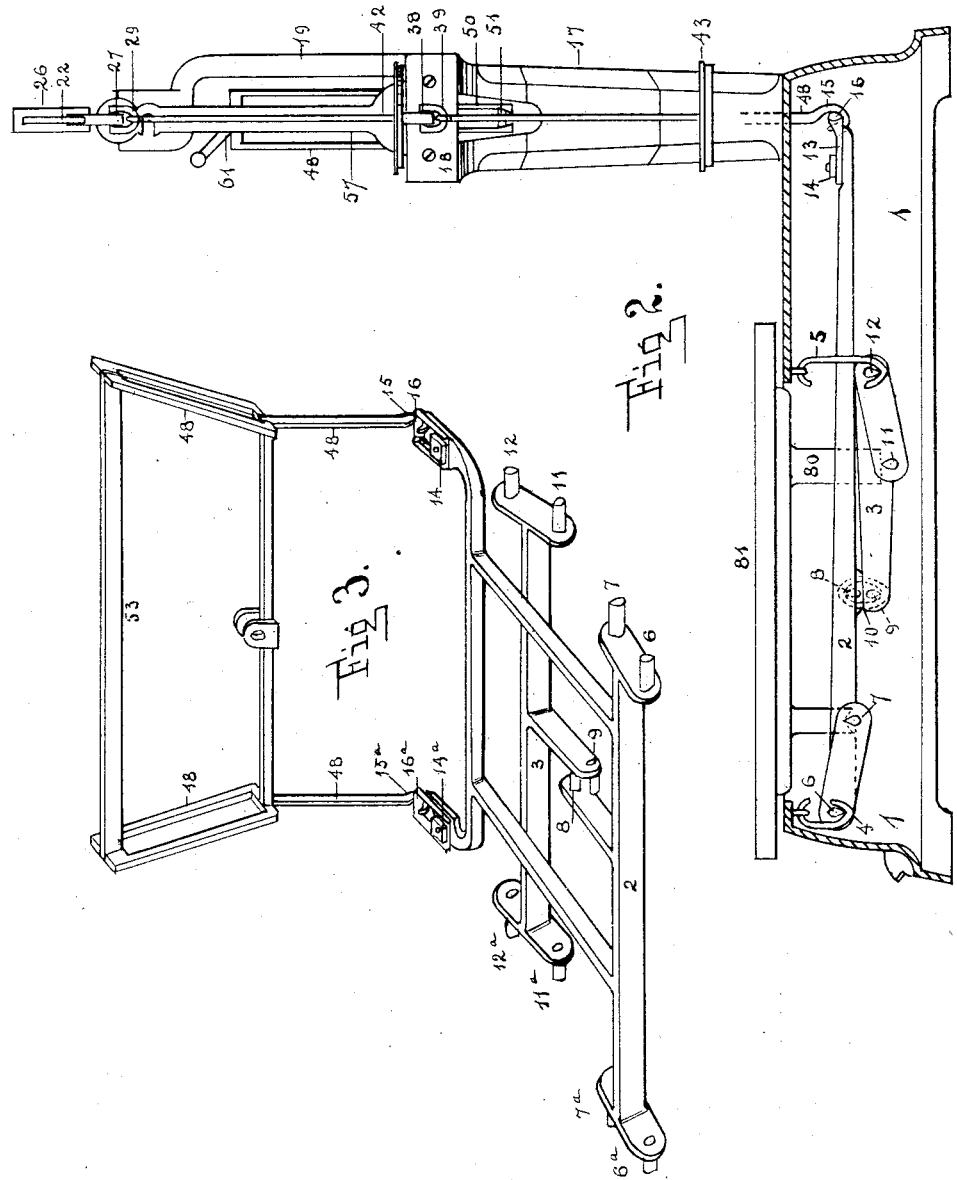

No. 832,011. PATENTED SEPT. 25, 1906.
J. W. CULMER.
COMPUTING SCALE.
APPLICATION FILED NOV. 23, 1904.
4 SHEETS—SHEET 3.
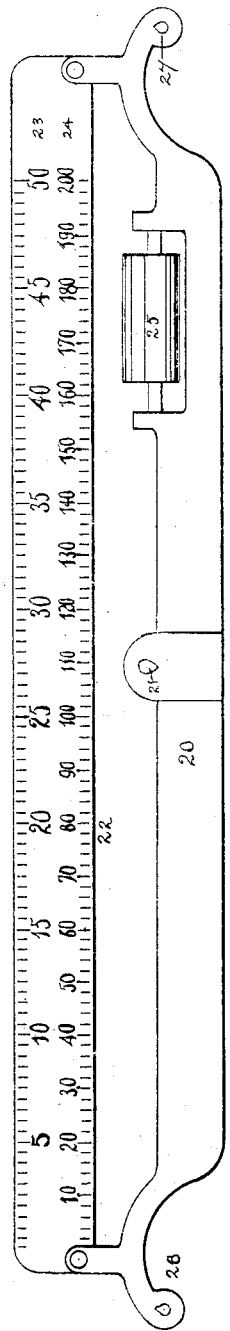
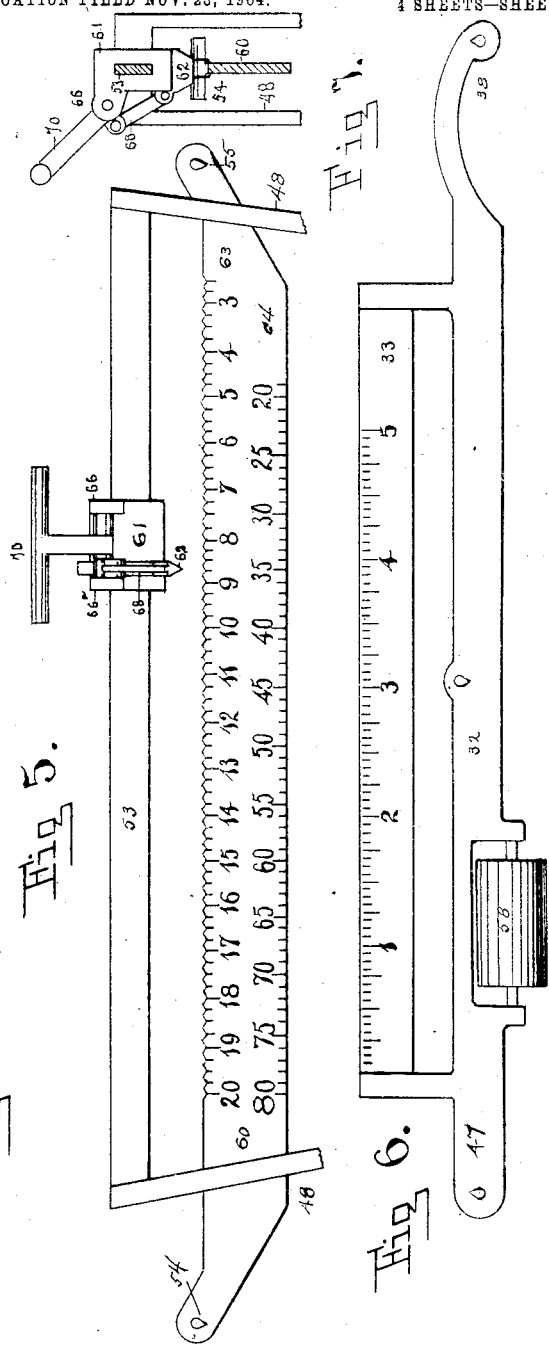
WITNESSES:
Geo Schuber
D. W. Culmer.
INVENTOR
John W. Culmer

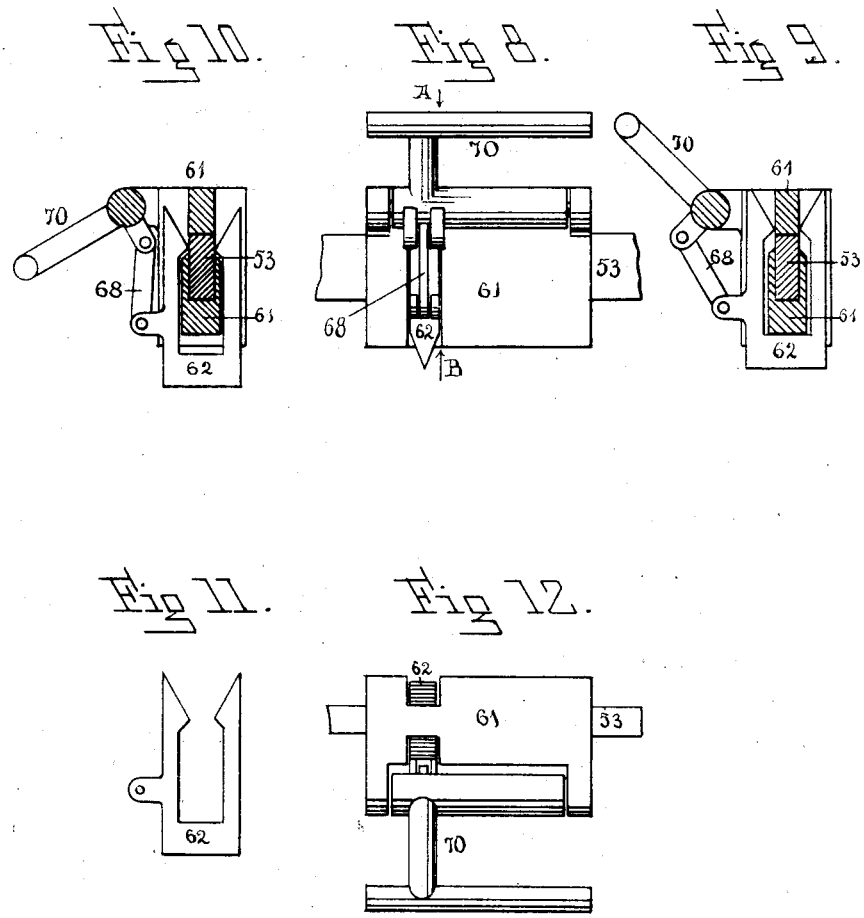

UNITED STATES PATENT OFFICE.

JOHN W. CULMER, OF CLEVELAND, OHIO.

COMPUTING-SCALE.

No. 832,011.

Specification of Letters Patent.

Patented Sept. 25, 1906.

Application filed November 23, 1904. Serial No. 234,098.

*To all whom it may concern:*

Be it known that I, JOHN W. CULMER, a citizen of the United States, residing at Cleveland, in the county of Cuyahoga and State of Ohio, have invented a new and useful Improvement in Computing-Scales, of which the following is a specification, reference being had to the accompanying drawings and to the numbered reference-marks thereon.

The invention relates to computing-scales which indicate the value of any article placed upon the platform at the price per pound or other unit of weight at which the computing mechanism is connected to the weighing mechanism; and the improvements consist in interposing between the weighing elements and the value-beam a price-bar of greater length than heretofore used, whereby the length of the spaces representing increment of value are lengthened and chance of error thereby lessened; in spacing and price-marking said bar from its fulcrum toward its connection at the load end of the computing-beam, so that its increment-spaces are of the same length, whereby construction and adjustment are more easily performed than where differential spacing is required; in providing between the load-carrying elements and the computing mechanism a frame in constant connection with said load-bearing elements and adapted to connect with the computing mechanism at the operator's will, and in such other elements and combinations as shall be hereinafter described and claimed.

In the accompanying drawings, Figure 1 is a front elevation of a scale embodying my invention, the front of the scale-cap and a portion of the upper end of the columns being broken away and shown in section. Fig. 2 is a side elevation of the same with the side of the base removed to show the levers and connections. Fig. 3 is a perspective view of the levers and vertical frame removed from the base and columns. Fig. 4 is a view of the computing-beam. Fig. 5 is a view of the price-bar 60, carriage 61, and track-bar 53, showing their relation each to the others. Fig. 6 is a view of the weighing-beam. Fig. 7 is an end view of the carriage 61, showing the price-bar 60 and track-bar 53 in section. Fig. 8 is a front view of the carriage 61. Fig. 9 is a vertical cross-sectional view of the same with the fulcrum 61 raised on the line A B of Fig. 8. Fig. 10 is a vertical cross-sectional view of the same with the fulcrum 62 depressed. Fig. 11 is a detached view of the fulcrum 62, and Fig. 12 a top view of Fig. 8.

A base 1, Figs. 1 and 2, is provided with the usual staples for the suspension of the "corner-loops" 4 5, and within loops 4, so suspended, are placed the fulcrum-pivots of the long lever 2, which is extended forward so that its point-pivots 16 16$^a$ are directly below the oppositely-placed columns 17 17. The point-pivots 16 16$^a$ are adjustable toward and from the fulcrum-pivots 6 and made fast in place when properly distanced by the bolt and nut 14, Figs. 2 and 3. The short lever 3 is suspended within the loops 5 by its fulcrum-pivots 12 12$^a$, and its point-pivot 9 extends backwardly to vertical alinement below the pivot 8 of the long lever 2. A platform 81 rests upon the load-pivots 7 7$^a$ of the long lever 2 and upon the load-pivots 11 11$^a$ of the short lever 3, and the distances having been properly made between said pivots any load placed upon the platform 81 at any point thereof will be equalized as to its gravity or energy and will exert the correct draft at the point-pivots 16 16$^a$.

Upon the rear end of the base 1 (at the end removed from the fulcrum-loops 4) two counterpart columns 17 17 are made fast thereon. Upon the upper ends of said columns 17 17 a cap 18 of elongated rectangular form is attached thereto, and centrally upon said cap 18 a beam-stand 19 is made fast vertically. Within the cap 18 at its center a beam-seat 18$^b$ is provided for the reception of the fulcrum-pivot 18$^a$ of a weighing-beam 32. At the right-hand end of cap 18 is erected a beam-stop 57, and near the place of its attachment to the cap a pivot 49 is provided for the suspension of a shelf-lever 71. A frame 48 has practically vertical ends, the lower extremity of each end being hook-shaped, as shown at 15 and 15$^a$, and adapted to hook under the opposite point-pivots 16 16$^a$ of the weight-bearing lever 2. About midway of its height a cross-bar joins the opposite vertical ends, and above said cross-bar each end is constructed as an open frame through which the shelf-lever 71, the weight-beam 32, and the price-bar 60 pass longitudinally of the cap 18 and frame 48. At its top the vertical ends are joined by a track-bar 53, which is parallel with the several elements before named.

Upon a pivot 49, fitted transversely of the cap 18, a loop 50 is suspended, and within said loop by its pivot 51 a shelf-lever 71 extends longitudinally of the cap 18. At its opposite end the shelf-lever 71 is provided with a pivot 52, and midway between pivots 51 and 52 a central pivot 49ᵃ is seated within a bracket projecting upwardly from the cross-bar of the vertical frame 48. Upon the seat 18ᵇ of the cap 18 the weighing-beam 32 is seated by its fulcrum-pivot 18ᵃ. At its load end said beam is provided with a load-pivot 47, from which a loop 45 is suspended, and within the lower end of said loop the pivot 52 of the shelf-lever 71 is seated. The beam 32 extends in the opposite direction from its load-pivot beyond its fulcrum and at its outer end is passed through an opening in the end of the cap 18 and at the lower end of the beam-stop 57 and has a point-pivot 38, provided with a point loop 39, from which is suspended a pendant-poise 43, upon which loose weights may be placed in the usual way.

Upon the upper edge of the beam 32 and about equidistant from its fulcrum are vertical projections, upon or within which is seated a scale-bar 33, which is graduated, spaced, and marked to indicate pounds and fractions thereof from zero at the point nearest the load to five pounds at the point nearest the beam-neck. A slidable poise 36 is fitted upon said bar 33 and indicates upon the graduated scale in the ordinary manner. The upper end of the beam-stand 19 is bifurcated, and seated within this space upon its fulcrum-pivot 21 is a computing-beam 20. Equidistant from its fulcrum at either end of said beam are point-pivots 27 28, fitted with the point-loops 29 30. Suspended from the loop 29 is a pendant-poise 42, adapted to receive loose weights in transactions greater than the capacity of the beam and sliding poise. Between the fulcrum and point-pivot is fitted a balance-ball 25, and extending from the end of the beam 20 is a pin 59, which passes within an opening in the beam-stop 57 and limits the vertical movement of said beam.

Supported vertically above the line of the pivots 21 27 28 is a scale-bar 22, having an upper (23) and a lower (24) scale of graduations arranged to read progressively from the load end toward the point-pivot of the beam 20, and to enlarge the scope or capacity of the beam the lower scale-graduations 24 are numbered as of four times the value of the upper scale-graduations 23. As shown in Fig. 4, the upper graduations 23 represent one-half cent each, and the lower graduations represent two cents each in practice. However, this may be varied and a preferred form used, maintaining the multiple of four to one.

The pendant-poise 42 has its bar marked in two vertical columns which represent increments in the one column of the total value of scale 23 and in the other column of the total value of scale 24, and loose weights are provided adapted to register upon said columns the total value in even multiples, while the fractional part, less than the smallest loose weight, is indicated upon scale 23 or 24 by the poise 26. A hook 56 projects inwardly from the vertical beam-stop 57, a loop 58 is suspended therefrom, and a price-bar 60 is suspended within said loop by a fulcrum-pivot 55 and is passed longitudinally of the vertical frame 48 through the open ends thereof and provided with a pivot 54 at its outer end. A connecting-hook 31 hooks upon the load-loop 30 of the beam 20, and the price-bar 60 is suspended therefrom by a loop at the lower end of hook 31, in which loop is seated the pivot 54 of the bar 60, which is thus supported in alinement below and parallel with said beam 20, and the said beam is balanced by means of the pendant 42 and ball 25, so that the beam balances upon its fulcrum 21 and the price-bar 60 balances upon its fulcrum 55, together but independently of any other element. Upon the horizontal cross-bar 53 of the vertical frame 48 is fitted a sleeve 61, which has at its ends in front projections into which is journaled the shaft of the T-handle 70. A U-shaped fulcrum 62, having its lower bar knife-edged, is fitted within a vertical recess in the sleeve 61 and is connected by a link 68, Fig. 7, to a crank projection on the handle-shaft, so that when said handle 70 is depressed the fulcrum is thrown downwardly, and when the handle is raised said fulcrum is drawn up toward the sleeve 61.

The illustrations in the drawings, Figs. 1, 2, and 3, are approximately to a scale of one-third actual size, but are in the proper relative proportions for production in any approved scale. As shown, the levers 2 3 in the base 1 have a multiplication of eight to one. The shelf-lever 71 transmits this to the weighing-beam 32 at two to one, and the point-pivot 38 of the said beam 32 extends this by one and one-fourth to one, making the total multiplication of the weighing mechanism twenty to one, whereby one pound placed upon the pendant's poise 43 will balance twenty pounds upon the platform 81. The vertical frame 48 being directly attached to the weight-carrying lever 2 is at a multiplication of eight to one, and as it is requisite that the loose weights in use upon the weighing mechanism should also serve upon the computing-beam when required it is necessary that the price-bar 60 and the scales 23 24, together with the point-pivot 27, should correspond in multiplication of value with the multiples of the weighing mechanism with which they must coöperate. To this end the price-bar 60 is divided theoretically into one hundred spaces from zero at its fulcrum to one hundred at its connecting-pivot 54, and as the computing-beam 20 has its load-pivot 28 and its point-pivot 27 equidistant from its fulcrum 21 when a load is applied at a point on the price-bar 60 two-fifths of the distance from its fulcrum 55 toward its draft-pivot 54 the multiplication exerted upon the beam 20 will be two and one-half times the constant eight to one of the bar 53, which transmits the platform-load, and the multiplication at the pendant 42 of the beam 20 will be twenty to one, as is that at the pendant 43 of the weighing-beam 32, having established ten cents per pound as the price at the point on the bar 60, forty spaces from its fulcrum. The said bar 60 is graduated from its fulcrum (beginning at the tenth theoretical space, which will represent a price of two and one-half cents, because the fortieth space represents a price of ten cents) up to the eightieth theoretical space, which will represent twenty cents, each graduation representing an increment of one-fourth cent, and this series 63 of price-graduations is marked as of the values or prices per pound thus indicated. A second series 64 of like graduations are made, beginning immediately below the graduation indicating five cents and ending below that which indicates twenty cents. This second series 64 is marked to represent increments of one cent each, from twenty cents immediately below the five-cent price on series 63 to eighty cents below the twenty-cent price on series 63. As the capacity of the weighing-scale bar 33 is five pounds and the smallest loose weight required upon its pendant-poise 43 indicates also five pounds, it is evident that at ten cents per pound on the price-bar 60 a similar weight will balance fifty cents upon the pendant-poise 42 and will represent fifty cents' worth at any other price upon said price-bar 60. The upper scale of values 23 on the value-bar 22 is made to represent a total of fifty cents, being graduated in increments of one-half or one-fourth cent, as desired, and marked to read from zero at its load end to fifty at its outer or "point" end. The second scale 24 is graduated in similar spacings and is numbered as of four times the values of the scale 23, and a slidable poise of the proper gravity 26 with a reading edge adapted to indicate upon both scales 23 24 is mounted thereon.

It will be seen that a greater number of price series may be used on the price-bar 60 and corresponding value-scales on the value-bar 22, it being only necessary that all shall be multiples or submultiples of the others and that the series on price-bar 60 shall correspond with the scales on value-bar 22.

In operation where it is desired to ascertain the weight of any given article it is not necessary that the fulcrum 62 should be in contact with the price-bar 60, although such contact will not affect the accuracy of the weighing mechanism. The article is placed upon the platform 81, thereby disturbing the "balance" of the mechanism, the frame 48 is depressed by the lever 2, and the shelf-lever 71 is depressed from its fulcrum 51 by its pivot 49$^a$, connected with said frame, and through its pivot 52 and loop 45, connected with the weighing-beam 32 by its load-pivot 47, causes said weighing-beam to vibrate upon its fulcrum 18$^a$. Weights are placed upon the pendant 43, if necessary, and the poise 36 is moved out upon the scale 33 until the mechanism is again in balance, at which point the weight of the article will be indicated by the said poise 36 or, if loose weights have been added, upon the pendant 43 by their amount added to the fractional amount indicated by poise 36. If it is desired to ascertain the money value of an article placed upon the platform 81, the sleeve 61 is moved by the handle 70 along the bar 53 until its knife-edge fulcrum 62, Figs. 5 and 7, is directly above the desired price-graduation, the handle 70 is depressed, and the fulcrum brought into contact with the upper edge of the price-bar 60 at that desired graduation, and, if necessary, loose weights are placed upon pendant 42, and poise 26 is moved out upon the bar 22 until a balance is obtained, when the amount or value will be found by adding the even value shown on the proper pendant-scale to the fractional value shown on the proper horizontal scale on bar 22 by poise 26, both scales corresponding to the series of the selected price on the price-bar 60.

In nearly all the types of computing-scales with which I am familiar hitherto the price series have been arranged upon the lower bar of the value-beam. Thus in the scale herein illustrated the price series 63 64 would be placed upon the bar 20 of the value-beam and would extend from the fulcrum 21 toward the load connection 28 30. The departures from this custom have either required a differential spacing of the price-bar, which is liable to error in construction and adjustment, or have been fulcrumed intermediate of their ends, thus limiting the working length of bar and exaggerating the arc through which the value-beam must travel when connected near their fulcrum. In the construction shown the spaces indicating increment of price are of greater length than can be obtained in other forms. They are of uniform length and can be made upon the ordinary tools for such purposes.

In Fig. 5 is shown an enlarged view of the price-bar 60, with its upper edge notched, and while this is not an essential it is a preferable form of construction, and such bars may be placed in packs in an ordinary "shaper" and notched with a tool of the proper profile, after which the pivots are set in each bar at the proper distance from the end notches and the graduations made from the bottoms of said notches. The fulcrum 62 has its knife-edge formed at an acute angle, while the notches should approximate one hundred and twenty degrees, so that in use the said fulcrum 62 will be led when depressed to the bottom of the proper notch and all danger of error eliminated.

In Figs. 8 to 12, inclusive, I have illustrated the structure of the carriage 61, its movable fulcrum 62, having interiorly-projecting upwardly-extending arms, and their accessories and relations to the track-bar 53, upon which the carriage is moved. It will be seen that interiorly the fulcrum 62 has by means of said projecting upper ends a spring or elastic contact upon the track-bar 53 when the fulcrum is depressed and upon the carriage 61 when raised and that when the handle 70 is depressed and the fulcrum 62 in its "contact" position the relative positions of the handle 70, the link 68, and the fulcrum 62 lock said fulcrum 62 in place until released by the elevation of the handle 70.

I claim—

1. In a scale, a base, horizontally-suspended levers within the base, a platform supported upon said levers, oppositely-placed columns above the free end of the longer of said levers upon the base, a cap upon said columns transverse the base, a shelf-lever pivotally supported, longitudinally from said cap, a vertically-positioned frame pivotally supported upon said shelf-lever, and extending around and above it and connected to the levers in the base, and a weighing-beam pivotally supported within said cap, its load-pivot flexibly connected with the free end of the before-mentioned shelf-lever, and its other end extending through the end of the cap, as shown and described.

2. In a scale, a base, horizontally-positioned load-carrying levers supported within the base, a cap above the free end of the longer of the load-carrying levers, a pivotally-supported shelf-lever parallel with said cap, a vertical frame surrounding and pivotally supported by said shelf-lever and extending above it, and connected with the load-carrying levers, a weighing-beam fulcrumed centrally within the cap and surrounded by the vertical frame, and flexibly connected with the shelf-lever therein as shown and described.

3. In a computing-scale, a rectangularly-pivoted load-carrying lever, a horizontal pivotally-supported bar connected thereto parallel with the beams, a value-beam fulcrumed above said horizontal bar, a notched price-bar fulcrumed below said horizontal bar, a flexible connection between said price-bar and value-beam, and a knife-edge fulcrum adapted to be moved along said horizontal bar, to be depressed into the notches of said price-bar, and to be locked in relation to the fulcrum thereof substantially as described.

4. A computing-scale comprising a base, columns vertically attached at one end of the base, levers fulcrumed within the base, one of which extends at its outer end below the oppositely-placed columns, point-pivots fitted upon said outer ends, a weight-carrying platform supported upon said levers, a horizontally-positioned cap upon said columns transverse the levers, a vertical frame pivotally supported longitudinally within the cap, and having its lower opposite ends connected with the oppositely-placed point-pivots of the before-named lever and its upper ends connected by a horizontal bar, a weighing-beam pivotally connected to said vertical frame at a fixed multiple of leverage and a slidable sleeve and vertically-movable fulcrum upon said bar, in combination with a price-bar fulcrumed upon the scale-frame graduated in plural series of price-graduations from its fulcrum toward its outer end, a superposed value-beam provided with a plurality of value-scales corresponding with the price series of the price-bar and flexibly connected with said price-bar, slidable poises upon said value-beam and weighing-beam, adapted to indicate upon the several scales thereon, pendants upon said beams adapted to receive interchangeable loose weights, and loose weights adapted to be used upon either weighing or value beam and to indicate thereon multiples of the total of any of their several scales, as shown and described.

5. In a computing-scale having a horizontally-positioned vertically-movable bar member, and a notched price-bar fulcrumed parallel with and below said horizontal bar, a carriage upon and movable longitudinally along said horizontal bar, a bifurcated vertically-movable fulcrum in said carriage fitted with interiorly-projecting points adapted to contact with said horizontal bar when the fulcrum is depressed, a rotatable handle upon said carriage, and a link connecting said handle with the vertically-movable fulcrum as shown and described.

In testimony whereof I have signed my name to this specification in the presence of two subscribing witnesses.

JOHN W. CULMER.

Witnesses:
ERNEST SCHWARTZ,
LINDLEY FOGG.